(12) United States Patent
Alrod et al.

(10) Patent No.: US 9,223,515 B2
(45) Date of Patent: Dec. 29, 2015

(54) DEVICES AND METHODS FOR DEVICE-MAPPING CONNECTIVITY HUB

(75) Inventors: Idan Alrod, Herzliya (IL); Itzhak Pomerantz, Kfar Saba (IL); Nitzan Achsaf, Tel Aviv (IL); Mordechai Teicher, Hod Hasharon (IL)

(73) Assignee: SANDISK IL LTD., Kfar Saba (IL)

( * ) Notice: Subject to any disclaimer, the term of this patent is extended or adjusted under 35 U.S.C. 154(b) by 294 days.

(21) Appl. No.: 11/860,549

(22) Filed: Sep. 25, 2007

(65) Prior Publication Data

US 2008/0082699 A1  Apr. 3, 2008

Related U.S. Application Data

(60) Provisional application No. 60/827,220, filed on Sep. 28, 2006.

(51) Int. Cl.
G06F 3/06 (2006.01)

(52) U.S. Cl.
CPC ............ *G06F 3/0664* (2013.01); *G06F 3/0605* (2013.01); *G06F 3/0688* (2013.01)

(58) Field of Classification Search
CPC .... G06F 3/0605; G06F 3/0664; G06F 3/0688
See application file for complete search history.

(56) References Cited

U.S. PATENT DOCUMENTS

| | | | | |
|---|---|---|---|---|
| 5,471,631 A * | 11/1995 | Beardsley et al. | ............ | 713/502 |
| 5,826,103 A * | 10/1998 | Whittaker | .......................... | 710/8 |
| 6,189,050 B1 * | 2/2001 | Sakarda | .......................... | 710/18 |
| 6,205,501 B1 * | 3/2001 | Brief et al. | .................... | 710/100 |
| 6,681,270 B1 | 1/2004 | Agarwala et al. | | |
| 6,721,818 B1 * | 4/2004 | Nakamura | .......................... | 710/9 |
| 6,832,271 B1 * | 12/2004 | Ivan et al. | ........................ | 710/15 |
| 6,862,643 B2 | 3/2005 | Wu et al. | | |
| 6,946,817 B2 | 9/2005 | Fischer et al. | | |
| 7,131,595 B2 * | 11/2006 | Wurzburg | ..................... | 235/492 |
| 7,437,505 B2 * | 10/2008 | Chew | ............................ | 711/112 |
| 7,640,334 B2 * | 12/2009 | Spinks et al. | .................. | 709/224 |

(Continued)

FOREIGN PATENT DOCUMENTS

EP      0872799 A2     10/1998

OTHER PUBLICATIONS

The USB Specification Rev 2.0; pp. 16-24, 119-121, 171-174, 312-218 Apr. 27, 2000 http://www.usb.org/developers/docs/.*

(Continued)

*Primary Examiner* — Eric Oberly
(74) *Attorney, Agent, or Firm* — Toler Law Group, PC

(57) ABSTRACT

The present invention discloses devices and methods for a connectivity hub, for connecting a plurality of storage devices to a host system, including: a plurality of ports, each port operative to electrically engage with a storage device; electrical paths joining the plurality of ports to a common point operationally connected to the host system; and a controller operative to associate a relative physical location with a logical identity for each port. Preferably, the controller is configured to perform the association by correlating an insertion time of the storage device in a respective port with a detection time of the logical identity. A connectivity hub, for connecting a plurality of storage devices to a host system, including: at least 23 ports, each port operative to electrically engage with a corresponding storage device; and electrical paths joining at least 23 ports to a common point operationally connected to the host system.

29 Claims, 4 Drawing Sheets

(56) References Cited

U.S. PATENT DOCUMENTS

| | | | |
|---|---|---|---|
| 7,743,409 B2* | 6/2010 | Gonzalez et al. | 726/9 |
| 2002/0174330 A1* | 11/2002 | Cabrera et al. | 713/100 |
| 2006/0212623 A1 | 9/2006 | Honma | |
| 2006/0253673 A1* | 11/2006 | Lee et al. | 711/163 |
| 2007/0023499 A1* | 2/2007 | Wurzburg et al. | 235/376 |
| 2007/0100843 A1* | 5/2007 | Chen et al. | 707/100 |
| 2007/0180181 A1 | 8/2007 | Cehn et al. | |

OTHER PUBLICATIONS

USB Complete: Third Edition by Jan Axelson Copyright 2005, Published (Aug. 31, 2005).*

Axelson, Jan; USB Complete, $3^{rd}$ ed.*

USB Complete: Third Edition by Jan Axelson Copyright 2005, Published (Aug. 31, 2005) p. 41, 71, 83, 427.*

Axelson, Jan; USB Complete, 3rd ed.*

Axelson, Jan; USB Complete $3^{rd}$ Edition; Copyright 1999-2005.*

Compaq et al: "Universal Serial Bus specification Revision 2.0—Chapter 11—Hub Specification" Apr. 27, 2000, xp002427266.

Inia, H. et al. "Designing a USB Hub: Basic Options and Issues," EDN Electrical Design News, Reed Business Information, Highlands Ranch, CO, US, vol. 43, No. 2, Jan. 15, 1998, pp. 113-114, 116, 118, 129, XP000773049, ISSN: 0012-7515.

usbview.exe (Microsoft® Windows™ USB Device Viewer), http://www.processlist.com/info/usbview-2.html, printed Aug. 11, 2009, 3 pages.

Notification of the Transmittal of the International Search Report and the Written Opinion of the International Searching Authority, or the Declaration, PCT/IL2007/001155, Jan. 10, 2008, 13 pages.

\* cited by examiner

DEVICES AND METHODS FOR DEVICE-MAPPING CONNECTIVITY HUB

This patent application claims priority under 35 U.S.C. §119(e) to U.S. Provisional Application No. 60/827,220 filed Sep. 28, 2006, which is hereby incorporated by reference in its entirety.

FIELD AND BACKGROUND OF THE INVENTION

The present invention relates to devices and methods for providing user-specific connectivity, to a plurality of storage devices, for a plurality of end-users in a room.

In recent years, the information technology (IT) industry has been rapidly expanding. In an effort to provide significant benefits to the classroom environment, educational institutions have taken advantage of advanced IT tools to integrate computers into the mainstream of the learning process. Providing such technology within the classroom environment enables a teacher to: more easily distribute information to the students, receive information (such as homework assignments) from the students, identify each student, and check attendance, for example.

However, not many educational institutions can afford to provide a computer for each user in the classroom. Requiring students to bring their own computers to the classroom is impractical. Furthermore, in order to administer an IT course or lecture, an adequately-sized and -equipped classroom facility must be located and reserved. The appropriate IT facility must be installed in the classroom, and the computers must be initially configured to communicate with each other (e.g. via a local communication or via the Internet). Due to the complexity of the IT equipment, providing such equipment is costly and can take considerable time and effort.

Existing IT limit the computer-based learning processes to equip these educational institutions, such as classrooms, with a computer per-user. Even in cases where computers are provided in public educational institutions, the need to identify end-users in a room, and easily distribute and receive information to and from the end-users simultaneously, such that this information is personally provided to each end-user, is still apparent.

In the prior art, Chen et al., US Patent Publication No. 20070180181 (hereinafter referred to as Chen '181), teaches a USB interface provided with a host/device function and its control method. Wu et al., U.S. Pat. No. 6,862,643 (hereinafter referred to as Wu '643), teaches a USB compound device for operating a plurality of devices by using the same USB logic circuit and the method for implementation thereof. Agarwala et al, U.S. Pat. No. 6,681,270 (hereinafter referred to as Agarwala '270), teaches effective channel priority processing for a transfer controller with hub and ports.

Ivan et al., U.S. Pat. No. 6,832,271 (hereinafter referred to as Ivan '271), teaches systems and methods for monitoring and displaying I/O data for a plurality of I/O devices. Honma, US Patent Publication No. 20060212623 (hereinafter referred to as Honma '623), teaches a data control apparatus. All the prior-art references cited above do not teach methods for identifying the relative physical locations of storage devices engaged in a port hub, nor do they teach methods for mapping such locations to the logical identities of the storage devices.

In view of the present needs, it would be desirable to have devices and methods for identifying a plurality of end-users in a room, and personally distributing information to and from such end-users in an easy manner without requiring a complex IT facility.

SUMMARY OF THE INVENTION

It is the purpose of the present invention to provide devices and methods for providing user-specific connectivity, to a plurality of storage devices, for a plurality of end-users in a room.

For the purpose of clarity, several terms which follow are specifically defined for use herein. The term "key" is used herein to refer to any means having a distinguishing feature for storing unique information that is operative to lock and/or unlock a locking mechanism, including, but not limited to: a mechanical key, a biometric feature of a user (e.g. a fingerprint), a password, and a message received from a mobile device (e.g. cellular phone). The operation of the key in the locking mechanism can be mechanical, wired, or wireless.

The terms "portable storage device" and "PSD" are used herein to refer to any mass-storage device (e.g. a USB flash drive (UFD), Multi-Media Card (MMC), and Secure Digital (SD) card) that can be operationally connected to a host system via a standard port (e.g. a UISB socket). Another example of how a PSD could be configured is to have a USB device operationally connected to a UFD via a wireless connection such that the USB connector of the USB device is not physically adjacent to the UFD (e.g. using Bluetooth technology). In such a configuration, the UFD could be located in or connected to an electronic mobile device (e.g. a cellular phone or a PDA). It is noted that the term UFD is used herein as an exemplary portable storage device.

The present invention predicts the duration of storage operations by accounting for more factors than known in prior-art systems, such as the effect of automatic memory operation. The present invention may be embodied as a storage device/system for a processor or as a method for performing a storage operation.

The present invention may be embodied as a single device-mapping connectivity hub configured with a plurality of ports to provide a single connection point with a host system. A user wishing to be identified by, or to communicate with, the host system in a room only needs to plug his/her portable storage into one of the device ports on the connectivity hub in correspondence to the layout of the user's location in the room.

In addition to existing devices that are limited in their configuration to connect a limited number of ports only, the connectivity hub of the present invention provides a single connection point to a much greater number of ports while associating between a logical identity of the connected portable storage device (PSD) and a physical identity of the port in which the PSD resides. Thus, the implementation of a single connectivity hub in a room replaces the need to equip the room with "one machine per user" and complex IT equipment.

In order to connect a plurality of PSDs to a single connectivity hub, the a method for mapping the PSDs on the host system is necessary. Typically, upon connecting a UFD (for example) to a host system, the UFD is assigned (by the Microsoft® Windows® operating system (OS) of the host system) a valid drive letter that is used to address the UFD as any other disk. Since there are only 26 letters in the English alphabet, and since some letters are already reserved for local disks (e.g. A-D drives) and some letters are usually mapped as network drives, there is a limited number of drive letters to be used for external UFD devices.

Existing technologies disclose no practical way to efficiently distribute information between a host system and a large number of UFDs (e.g. in a classroom environment having more than 20 students present). Even in the case that the number of UFDs is less than 20, it is still difficult to recognize the available drives that correspond to PSDs from the drives that are mapped to a local hard disk or network connection. Hence, a more-efficient implementation is required for connecting a large number of PSDs to a single port hub.

Looking at the USB-hardware limits of the Windows OS, it turns out that the UISB standard allows for up to 128 devices to be connected using USB ports. Practically, there are no off-the-shelf PCs having 128 physical USB ports. However, the available number of USB ports can be increased via a UISB port hub in order to achieve the number of USB ports required.

Existing port hubs typically include 6 USB ports. The port hubs can be used as USB extensions, connected to each other in a tree-like fashion, to provide the desired number of total USA ports. Each port hub that is used as a USB extension consumes one UISB port in the port-hub tree. So, in practice, such a configuration would not provide 128 USB ports for connection to UFDs.

Still, the use of 6-port hub extenders provides over 100 available UISB ports over standard port hubs having 4 USB ports known in the art. Since a typical classroom includes no more than 100 students, the implementation for providing up to 100 USB port connections for PSDs, as described herein, is practical.

However, there is still the need for the necessary software that would enable the OS of the host system to mount the PSDs. When the OS detects that a PSD is connected to a USB port, then a volume is immediately set to the PSD. Then, as mentioned earlier, the OS mounts this volume as a drive. The drive letter is selected as the next available letter from the English alphabet. In the event that a drive letter is unavailable, the device is still recognized (i.e. the volume still exists, but the volume is simply not mounted). Thus, a recognized device that is not mounted to an available letter from the English alphabet does not have direct access through the file system (FS) of the OS.

Some operating systems, such as Windows XP, have a helpful feature to cope with such a problem. The OS allows the user to manually mount each such recognized volume as a directory in an existing drive, provided that the existing drive (e.g. "C:\") is formatted as an NTFS drive. Fortunately, most hard disks are presently formatted in the newer NTFS format rather than in the FAT (file allocation table) format. Note that a UFD itself can still serve as a drive in the FAT format, only the host drive of the UFD has to support NTFS.

This means that when the allocated directory is mounted, read/write/erase operations are redirected to the designated device via the device's corresponding volume. Note that this manual mount operation is supported in parallel with the mounting of the volume as a drive. In such a case, the volume can be mounted via both the device and/or the drive.

The result is that the user is left with the following not-so-practical procedural steps as a solution:
(1) insert a UFD into a USB port;
(2) wait until the UFD is recognized by the OS and a drive letter is assigned to the UFD (i.e. the device is mounted as a drive);
(3) manually dismount the UFD, removing the allocation of the drive letter [See the Appendix for the corresponding command procedure]; and
(4) manually mount the UFD as a directory in an existing drive (e.g. "C:\USB_ports") [See the Appendix for the corresponding command procedure].

Note that steps (3) and (4) are interchangeable. Up to this point, no new software has been introduced. A major drawback of the above procedure is that the procedure has to be performed manually. Assuming there are 50 students in a classroom trying to connect 50 UFDs, by the time the above procedure is repeated 50 times, the class may be over.

Therefore, there is a need to perform the above steps automatically, via a process that continuously runs in the OS. The Visual Basic code, provided below in the Appendix, enables such a process. In addition to the above-mentioned steps, the process also enables the following additional steps to be performed:

(5) perform steps (1)-(4) (described above) only when it is determined that a PSD (e.g. UFD) is inserted into the USB port (as opposed to any USB device), avoiding the unwanted scenario of redirecting other USB-based devices (e.g. a CD/DVD drive) to a directory, for example;
(6) determine whether a secondary directory name (e.g. "C:\USB_ports") exists in a pre-defined drive (i.e. "C:\"); if so, each UFD is mounted as a sub-directory in the secondary directory;
(7) create a secondary directory name in the event that the secondary directory name does not already exist;
(8) add a respective sub-directory name for each UFD to be mounted from the secondary directory [For simplicity, the code provided in the Appendix defines "C:\USB_ports\UFD1", "C:\USB_ports\UFD2", etc. as the respective sub-directory names for each UFD]; and
(9) upon removal of a UFD from the connectivity hub, remove the respective directory name allocated for the UFD (e.g. "C:\USB_ports\UFD1"); in the event that all the UFDs are removed from the connectivity hub, remove the secondary directory (e.g. "C:\USB_Ports") also.

In a preferred embodiment of the present invention, the host system is notified of the physical port identity by a USB-monitoring program, such as USB Viewer offered by Microsoft. USB Viewer detects the insertion of a USB device into any of up to 255 ports, and reports to the host system the identity of the port. USB Viewer, however, cannot identify the logical volume of an inserted UFD, and so cannot serve by itself to link a specific UFD to a specific port. The host system then identifies the logical volume that is newly mounted (as a device or as a directory). The time to complete these two operations is typically much less than one second, enabling the host system to deduce that a particular volume is associated with a particular physical port by correlating the detection of device insertion with the identification of a newly-mounted volume that immediately follows the insertion.

In another preferred embodiment of the present invention, the connectivity hub includes a USB port sensor that is operationally connected to the host system via a USB protocol, and has a hard-wired connection to each of the physical ports. By monitoring the electrical current through the ports, the port sensor can identify the insertion of a USB device into a port, and report the insertion event to the host system via the USB protocol. While the host system does not receive a direct indication from the port sensor about the identity of the UFD that is inserted into the connectivity hub, the time correlation between the detection of an engaged port and the mounting of a new volume clearly indicates the correlation between the port and the volume to the host system.

In another preferred embodiment of the present invention, the connectivity hub includes controllable mechanical or electronic switches on the VCC lines to each of the physical ports. When the host system needs to identify the volumes mounted into the connectivity hub and link the volumes to physical ports, the host system disconnects the VCC to all the UFDs via the switches, and then turns the VCC to each port on again one by one. Each port that is powered up will initiate the mounting process of the volume that is plugged into the port. This enables the host system to identify the volumes as they appear, and thus link each volume with the port that has been most recently powered on. As an example, if the host system uses this procedure to detect one port per second, the host system can map a 100-port connectivity hub in less than two minutes.

In another preferred embodiment of the present invention, identifying information about the logical volume is read by the USB-monitoring program (e.g. USB Viewer), and the information is used to link the logical volume to the physical port, disregarding the time correlation of the two process operations.

By using one of the methods described above, the host system can associate a student with a seat in a classroom. Such an association results from the following known information and sequence of events:
  (1) the student has a specific student ID file containing textual and visual information about the student;
  (2) the ID file resides in the student's personal UFD;
  (3) the UFD is inserted into a specific physical port;
  (4) the student is now associated with the port;
  (5) the port is associated with a specific seat in the room; and
  (6) the teacher's display can show that the student is located in a specific seat.

Therefore, according to the present invention, there is provided for the first time a connectivity hub for connecting a plurality of storage devices to a host system, the connectivity hub including: (a) a plurality of ports, each port operative to electrically engage with a storage device; (b) electrical paths joining the plurality of ports to a common point operationally connected to the host system; and (c) a controller operative to associate a relative physical location with a logical identity for each port.

Preferably, data, stored in the storage device, is configured to be displayed on a display at a display location that corresponds to a physical identity of a corresponding port.

Preferably, the ports are arranged in the hub in a layout corresponding to physical entities in a pre-defined space.

Most preferably, the layout corresponds to at least one location selected from the group consisting of: a location of users in a room and a location of seats in a room.

Most preferably, the layout includes a grid of any shape.

Preferably, at least one port includes an operational connection point to another hub.

Preferably, each port is adapted to engage with a port component selected from the group consisting of: a USB device a multi-media card, and a secured digital card.

Preferably, the hub further includes: (d) a locking mechanism for securing the storage device to a corresponding port, the locking mechanism configured to allow the storage device to be extracted from the corresponding port only upon the locking mechanism receiving an authorization provided by an authorized key.

More preferably, the locking mechanism includes at least one locking component selected from the group consisting of: a mechanical lock, a keypad, an electronic sensor, an optical sensor, an acoustic sensor, a magnetic sensor, and a biometric sensor.

More preferably, the authorized key is configured to operate the locking mechanism via at least one link selected from the group consisting of: a wired link and a wireless link.

Most preferably, the keypad is operative to be activated by the authorized key.

Preferably, the controller is configured to associate the relative physical location with the logical identity by: (i) activating switches to the plurality of ports, and (ii) correlating a current flow, enabled by activating the switches, between an engaged storage device and the controller.

Preferably, the hub further includes: (d) a port sensor for detecting the relative physical location of an engaged port with the storage device.

Preferably, the controller is configured to associate the relative physical location with the logical identity by correlating an insertion time of the storage device in a respective port with a detection time of the logical identity.

According to the present invention, there is provided for the first time a connectivity-hub system for connecting a plurality of storage devices to a host system, the connectivity-hub system including: (a) a connectivity hub including: (i) a plurality of ports, each port operative to electrically engage with a storage device; (ii) electrical paths joining the plurality of ports to a common point operationally connected to the host system; and (iii) a controller operative to associate a relative physical location with a logical identity of each port; and (b) a display module operative to display data stored in the storage device at a display location, of the display module, that corresponds to a device physical identity of a corresponding port in the hub.

Preferably, the ports are arranged in the hub in a layout corresponding to physical entities in a pre-defined space.

Most preferably, the layout corresponds to at least one location selected from the group consisting of: a location of users in a room and a location of seats in a room.

Most preferably, the layout includes a grid of any shape.

Preferably, at least one port includes an operational connection point to another hub.

Preferably, the each port is adapted to engage with a port component selected from the group consisting of: a USB device. a multi-media card, and a secured digital card.

Preferably, the connectivity-hub system further includes: (c) a locking mechanism for securing the storage device to a corresponding port, the locking mechanism configured to allow the storage device to be extracted from the corresponding port only upon the locking mechanism receiving an authorization provided by an authorized key.

Preferably, the controller is configured to associate the relative physical location with the logical identity by: (i) activating switches to the plurality of ports, and (ii) correlating a current flow, enabled by activating the switches, between an engaged storage device and the controller.

Preferably, the connectivity-hub system further includes: (d) a port sensor for detecting the relative physical location of an engaged port with the storage device.

Preferably, the controller is configured to associate the relative physical location with the logical identity by correlating an insertion time of the storage device in a respective port with a detection time of the logical identity.

According to the present invention, there is provided for the first time a connectivity hub for connecting a plurality of storage devices to a host system, the connectivity hub including: (a) at least 23 ports, each port operative to electrically engage with a corresponding storage device; and (b) electrical paths joining at least 23 ports to a common point operationally connected to the host system.

Preferably, the corresponding storage device is a Windows-based storage device.

According to the present invention, there is provided for the first time a business method for providing a visual representation of a venue, the business method including the steps of: (a) providing a panel with a plurality of ports, wherein each port corresponds to a relative venue position in the venue, the panel configured: (i) to accommodate a respective storage device engaged in each port; (ii) to report a physical identity of each engaged storage device to a host system, wherein the physical identity is associated with the relative venue position; and (iii) to allow data to be exchanged between each engaged storage device and the host system; and (b) offering the panel for sale.

According to the present invention, there is provided for the first time a method for connecting a plurality of storage devices to a host system, the method including the steps of: (a) configuring a plurality of ports on a connectivity hub to provide a common point operationally connectable to the host system; and (b) associating, via the hub, a relative physical location with a logical identity to each port.

Preferably, the method further includes the step of: (c) configuring at least one port to provide the common point with another hub.

Preferably, the method further includes the step of: (c) electrically engaging a storage device to a corresponding port.

Most preferably, the method further includes the step of: (d) displaying data, stored in the storage device, at a display location that corresponds to a physical identity of the corresponding port.

Most preferably, the method further includes the step of: (d) securing the storage device to the corresponding port, wherein the storage device can be extracted from the corresponding port only upon the hub receiving an authorization provided by an authorized key.

Preferably, the step of associating includes: (i) activating switches to the plurality of ports, and (ii) correlating a current flow, enabled by activating the switches, between an engaged storage device and the controller.

Preferably, the method further includes the step of: (c) detecting, via a port sensor, the relative physical location of an engaged port with the storage device.

Preferably, the step of associating includes correlating an insertion time of the storage device in a respective port with a detection time of the logical identity.

According to the present invention, there is provided for the first time a method for connecting a plurality of storage devices to a host system, the method including the steps of: (a) configuring a plurality of at least 23 ports, each port operative to electrically engage with a corresponding storage device; and (b) operationally connecting at least 23 ports to the host system.

Preferably, the corresponding storage device is a Windows-based storage device.

According to the present invention, there is provided for the first time a computer-readable storage medium having computer-readable code embodied on the computer-readable storage medium, the computer-readable code including: (a) program code for configuring a plurality of at least 23 ports, each port operative to electrically engage with a corresponding storage device; and (b) program code for operationally connecting at least 23 ports to the host system.

These and further embodiments will be apparent from the detailed description and examples that follow.

BRIEF DESCRIPTION OF THE DRAWINGS

The present invention is herein described, by way of example only, with reference to the accompanying drawings, wherein.

DESCRIPTION OF THE PREFERRED EMBODIMENTS

The present invention relates to devices and methods for providing user-specific connectivity, to a plurality of storage devices, for a plurality of end-users in a room. The principles and operation for providing user-specific connectivity for a plurality of end-users in a room, according to the present invention, may be better understood with reference to the accompanying description and the drawings.

Figure 1:
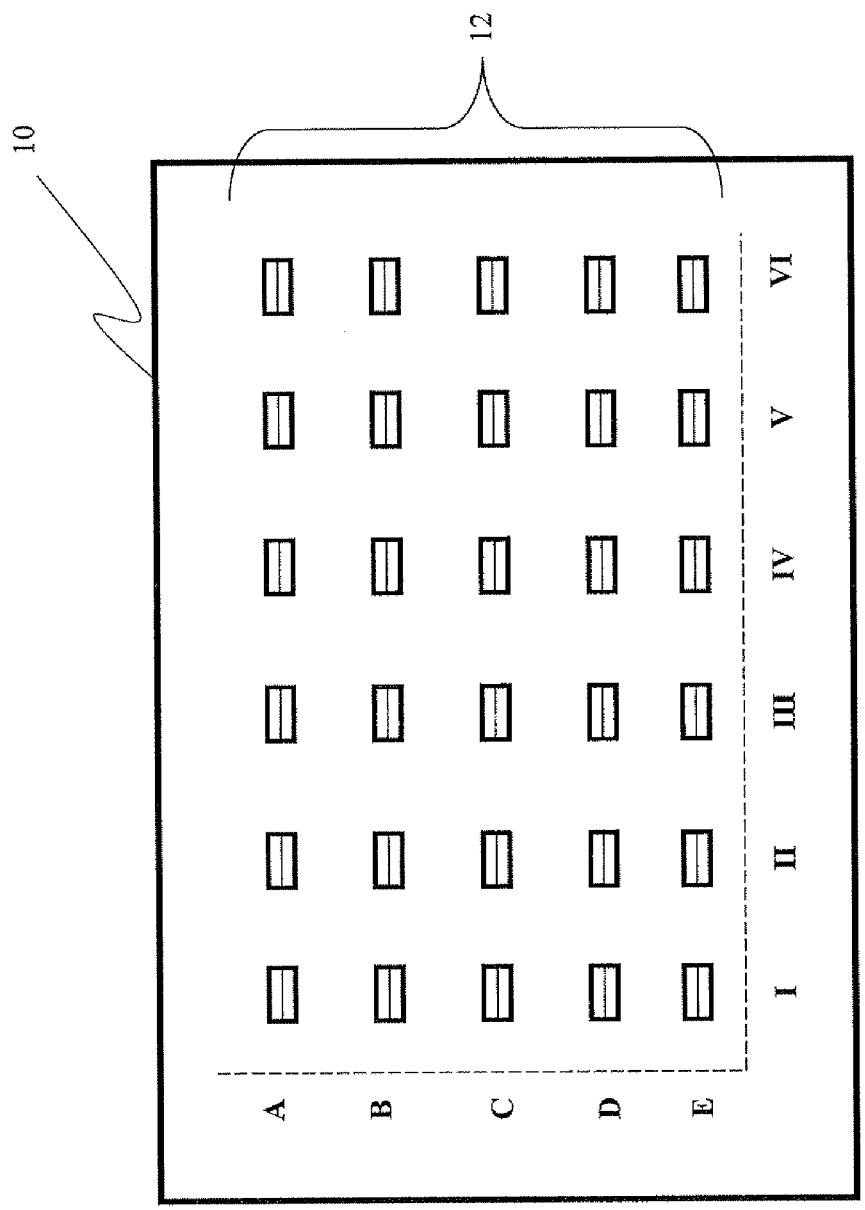
FIG. 1 is a simplified schematic block diagram of a device-mapping connectivity hub, according to preferred embodiments of the present invention.

Referring now to the drawings, FIG. 1 is a simplified schematic block diagram of a device-mapping connectivity hub, according to preferred embodiments of the present invention. A device-mapping connectivity hub 10 is shown in FIG. 1 having multiple ports 12 for connecting a plurality of PSDs. As an example, hub device 10 is configured with a total of 30 ports 12 in rows A, B, C, D, and E and columns I, II, III, IV, V, and VI, according to the layout of seats in a classroom.

A user entering the classroom connects his/her PSD into a respective port 12 in connectivity hub 10 according to the location of the user's seat in the classroom. For example, a student planning to sit in the right-most seat of the first row in the classroom connects his/her PSD to a respective port 12 located in connectivity hub 10 positioned in row A, column VI; whereas a student planning to sit in the left-most seat of the last row in the classroom connects his/her PSD to a respective port 12 located in connectivity hub 10 positioned in row E, column I.

Figure 2:
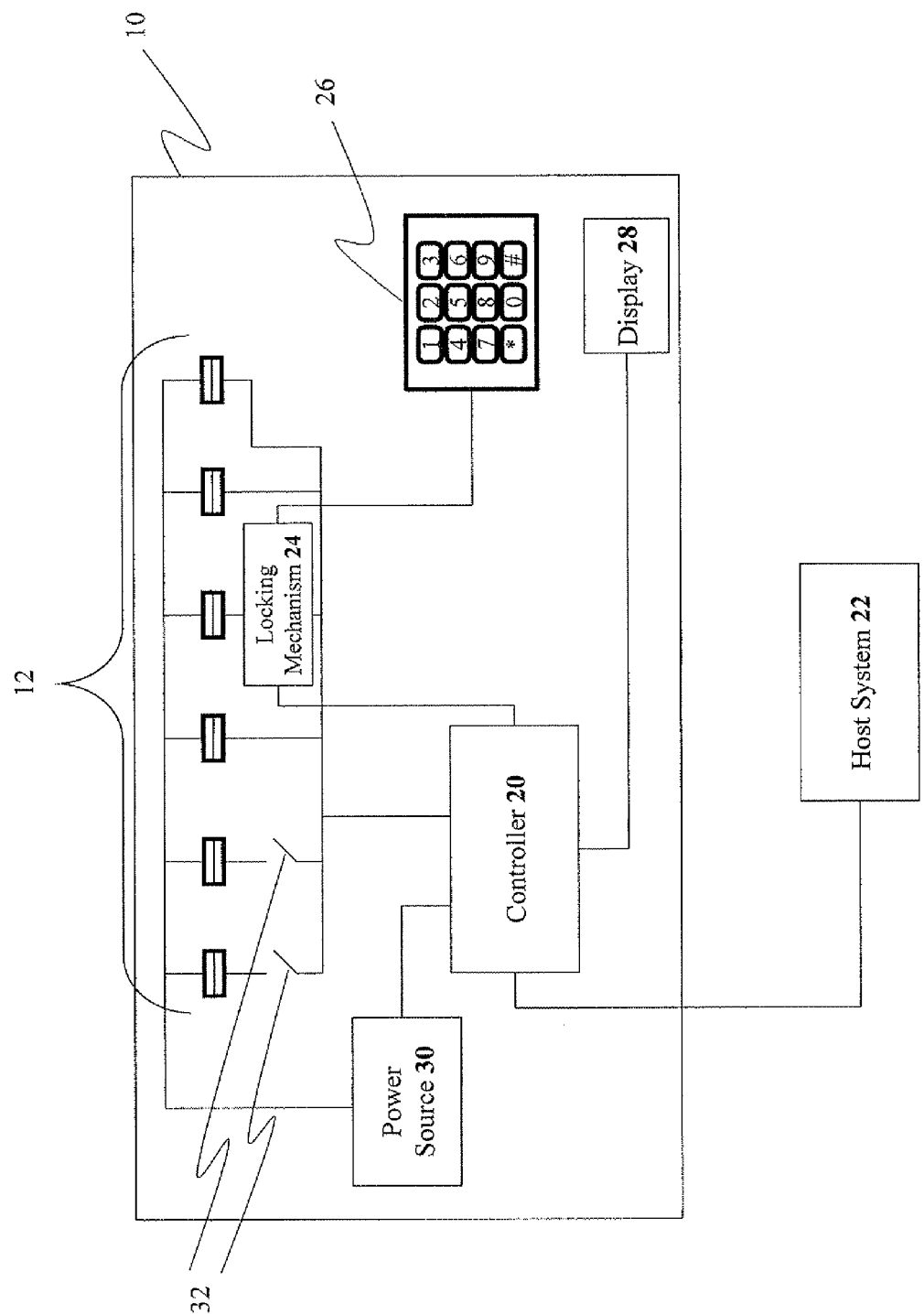
FIG. 2 is a high-level schematic block diagram of the connectivity hub of FIG. 1.

FIG. 2 is a high-level schematic block diagram of the connectivity hub of FIG. 1. A controller 20 monitors ID data passing through connectivity hub 10 from ports 12 via respectively-mounted PSDs. ID data from each storage device is transferred to a host system 22 (e.g. a teacher's computer). As an example, the ID data is displayed on host system 22 according to the layout of ports 12 in connectivity hub 10.

A locking mechanism 24 is optionally provided for locking a PSD in its position in connectivity hub 10 such that that removal of the PSD from its respective port 12 is possible only upon providing an authorized key. Locking mechanism 24 is provided to prevent an unauthorized user from removing a PSD that does not belong to him/her from connectivity hub 10.

Locking mechanism 24 can be implemented using an electrically-actuated latch, to secure and release the PSD in its position in connectivity hub 10, in conjunction with an authorizing device, for validating the user, such as a fingerprint-recognition device (e.g. Security Key Fingerprint Mini Flash Drive, available from ACP-EP Memory, Irvine, Calif.). Alternatively, locking mechanism 24 can be implemented using a physical key (as described in detail in US Patent Publication No. 20070016965, assigned to the assignee of the present invention, and hereby incorporated by reference as if fully set forth herein), or by entering a password (e.g. via a keypad 26) for unlocking the PSD from its respective port 12, enabling only an authorized user to disconnect the PSD.

Locking mechanism 24 is shown in FIG. 2 connected to only one port 12; however, it should be understood that a respective locking mechanism 24 can be connected to each port 12 as a token communication point (e.g. a USB port, a keypad, an electronic-sensor mechanism, and an optical-sensor mechanism). Implementing a biometric sensor, such as a fingerprint reader, within locking mechanism 24 for authenticating the user is optional. A display 28 is optionally provided for displaying the location of the seats in a room (e.g. for viewing by a user connecting his/her PSD to connectivity hub 10).

A power source 30, optionally residing within connectivity hub 10, is provided as a means for supplying power to each PSD connected to connectivity hub 10. Power source 30 is provided only in order to overcome the limitations of existing UFD technology known in the art, which have a strict limit on the total power consumption (and as a result, on the total number of devices) that can be used for power drawn from a host system.

Optionally, controllable port switches 32 (e.g. mechanical or electronic) can be connected to the VCC lines of each port 12. When host system 22 needs to identify the volumes mounted into connectivity hub 10 and link the volumes to physical ports 12, host system 22 disconnects the VCC to all the PSDs using switches 32, and then turns the VCC to each port 12 on again one by one. Each port 12 that is powered up will initiate the mounting process of the volume that is engaged into the respective port 12. This enables host system 22 to identify the volumes as the volumes appear in host system 22. Port switches 32 are shown in FIG. 2 connected to only two ports 12; however, it should be understood that a respective port switches 32 can be connected to each port 12.

Figure 3:
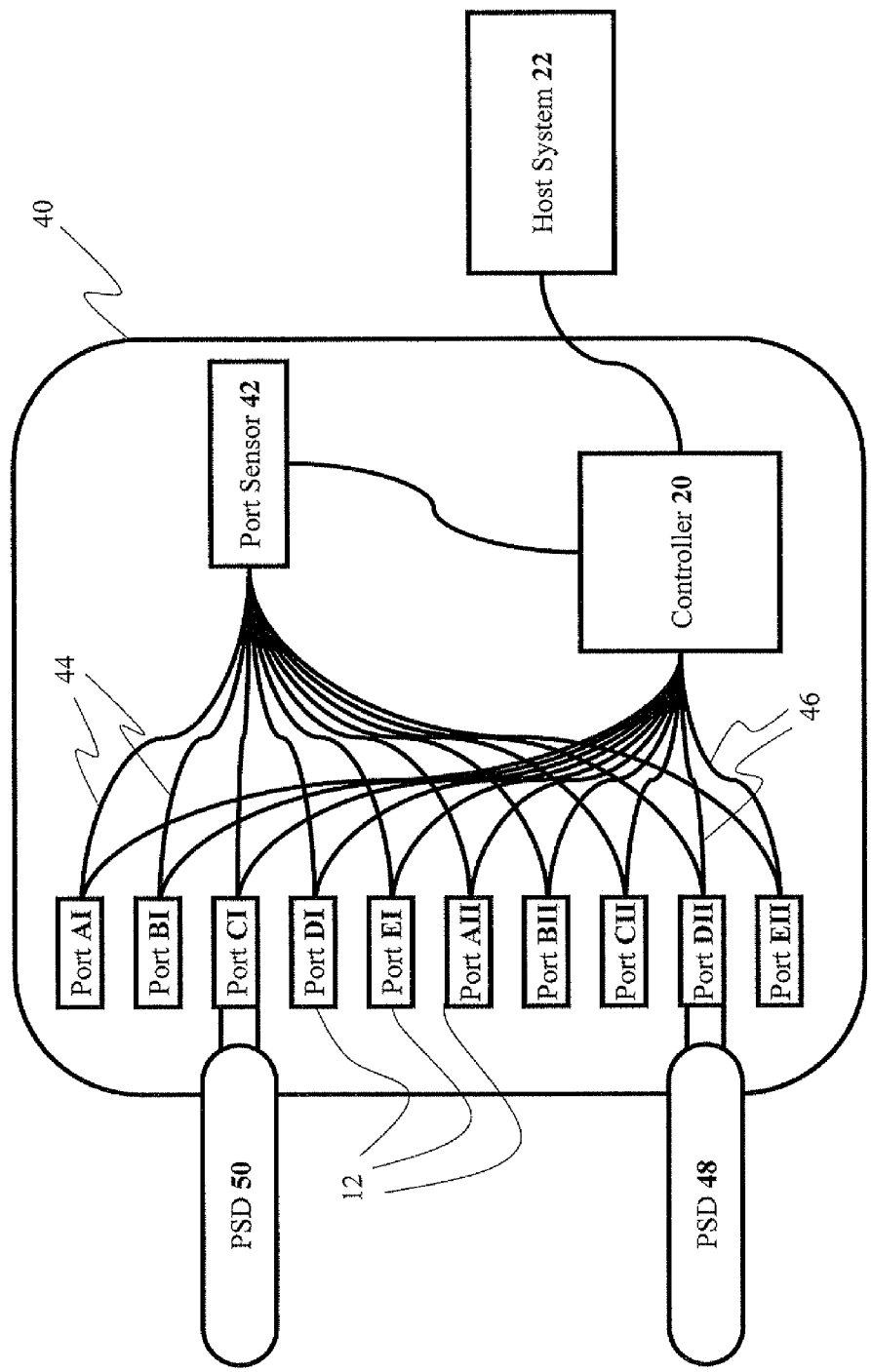
FIG. 3 is a simplified schematic block diagram of a device-mapping connectivity hub in which a port sensor is used to identify the physical ports of newly-mounted storage devices, according to preferred embodiments of the present invention.

FIG. 3 is a simplified schematic block diagram of a device-mapping connectivity hub in which a port sensor is used to identify the physical ports of newly-mounted storage devices, according to preferred embodiments of the present invention. A connectivity hub 40 includes a USB port sensor 42 that is connected to host system 22 via controller 20, and has hard-wired connections 44 to each physical port 12. By monitoring the electrical current through controller wires 46 to ports 12, port sensor 42 can identify, for example, the insertion of PSDs 48 and 50 into ports CI and DII (using the exemplary layout in FIG. 1 as an example), and report such an event to host system 22 via a USB protocol. While host system 22 will not get a direct indication from port sensor 42 about the identity of the PSD that is inserted into connectivity hub 32, the time correlation between the detection of an engaged port 12 and the mounting of a new volume clearly indicates to host system 22 the correlation between the engaged port 12 and the new volume.

It should be noted that the present invention relates to implementing a connectivity hub with a plurality of ports configured, in correspondence to the location of users in a classroom, to allow connection to a plurality of PSDs. However, it is understood that other implementations are possible within the scope of the invention, relating to a connectivity hub, of any design, implemented to provide a connection port to a plurality of external peripheral devices.

Figure 4:
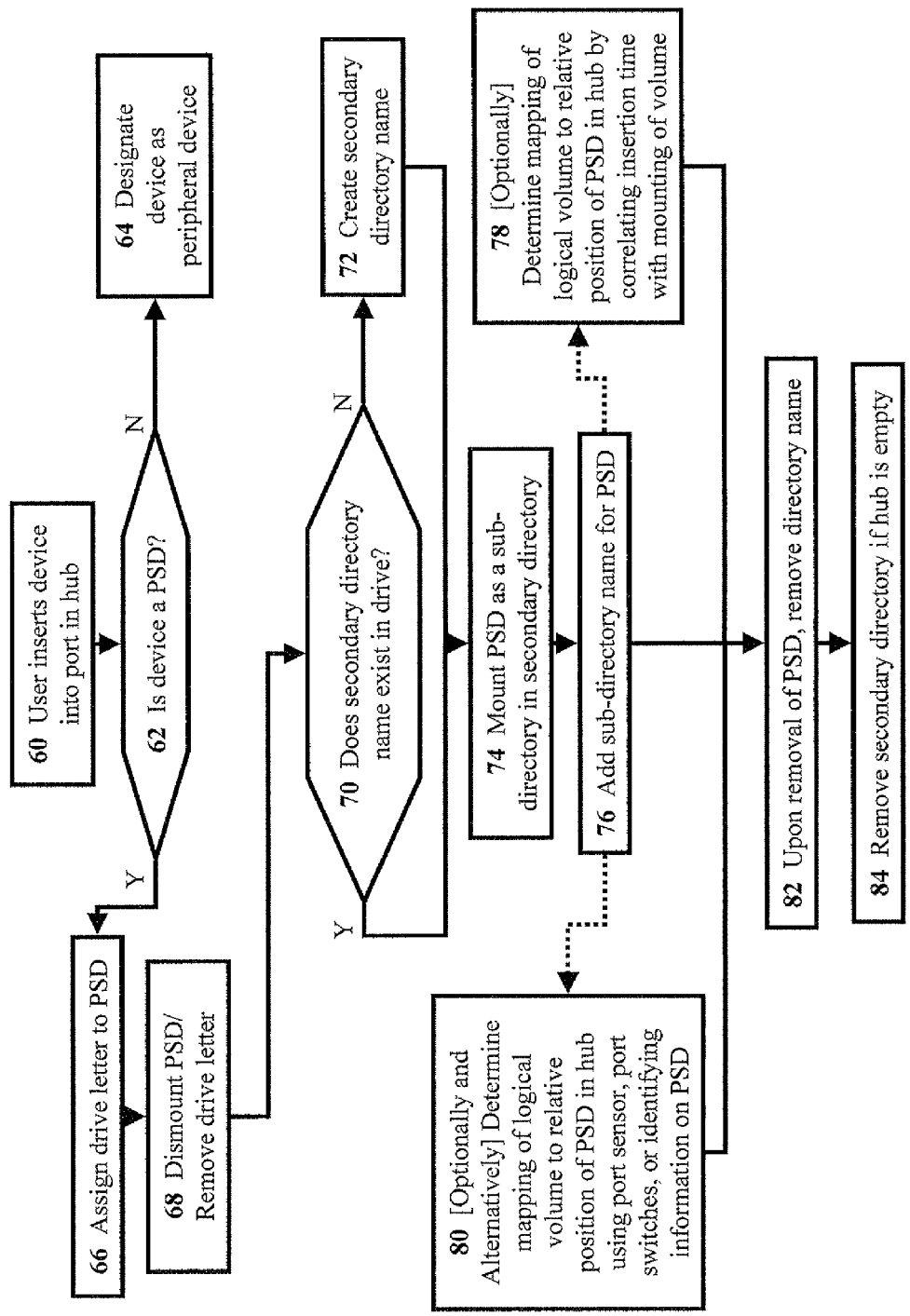
FIG. 4 is a simplified flowchart of the device-mapping procedure associated with the connectivity hub of FIG. 1, according to preferred embodiments of the present invention.

FIG. 4 is a simplified flowchart of the device-mapping procedure associated with the connectivity hub of FIG. 1, according to preferred embodiments of the present invention.

First, a user inserts a device into into a port of the device-mapping connectivity hub (Step 60). The system determines whether the device is a PSD (Step 62). If the device is not a PSD, the device is designated as a peripheral device (Step 64). If the device is a PSD, a drive letter is assigned to the PSD (Step 66). The PSD is dismounted, removing the allocation of the drive letter (Step 68).

The system then determines whether a secondary directory name exists in a pre-defined drive (Step 70). If a secondary directory name does not exist, a secondary directory name is created (Step 72), and the PSD is mounted as a sub-directory in the secondary directory (Step 74). If a secondary directory name exists, the PSD is mounted as a sub-directory in the secondary directory (Step 74). The system then adds a respective sub-directory name for the PSD to be mounted from the secondary directory (Step 76).

Optionally, the system can determine the mapping of the logical volume to the relative position of the PSD in the hub by correlating the insertion time of the PSD with the mounting of the volume (Step 78). Optionally and alternatively, the system can use a port sensor, port switches, or identifying information on the PSD to determine the mapping of the logical volume to the relative position of the PSD in the hub (Step 80).

Upon removal of the PSD from the connectivity hub, the directory name allocated for the PSD is removed (Step 82). If there are no remaining PSDs in the hub, the secondary directory is removed (Step 84).

In a more general way, the present invention can be used as a business method for providing a moderator (e.g. teacher, event coordinator, venue supervisor) with a venue layout. In such an embodiment, the venue (e.g. classroom, auditorium, campus, stadium) has objects (e.g. student belongings, desks, seats, and work stations) located in the venue. A panel (e.g. a device-mapping connectivity hub) having ports located in the panel is used to identify a relative physical location of storage devices engaged in respective ports with corresponding objects. A representation of the storage devices associated with the corresponding objects is displayed on a moderator display.

While the invention has been described with respect to a limited number of embodiments, it will be appreciated that many variations, modifications, and other applications of the invention may be made.

APPENDIX

The API functions used for the above set of operations are kept in Window's "Volume Management Functions". Among the functions used are:

SetVolumeMountPoint: Make the directory mount point to the volume name. Thus, when mounted the volume name is associated with the specified directory.

DeleteVolumeMountPoint: Release the drive letter that was created by the UFD's insertion.

GetVolumeNameForVolumeMountPoint: Return the volume name for the drive letter.

The attached source code include 3 'BAS' files. The code is written in Visual Basic. The following provide some insight to each of these files:

1. 'General.BAS': This file includes the type definitions and function declarations of the code.
2. 'Start.BAS' : This is the file that includes the "main( )" function. This function only activates the 'Bgen_Class' module. The purpose of this module is to detect 'device insertion' or 'device removed'. If the device is a USB removable disk (e.g., a UFD), the module activates the event 'DeviceDetect', and provides the information whether the device received a drive letter, and if it was inserted or ejected.

3. 'Fgen_main.FRM': This file includes the implementation of all functions that also handle the different events. The file contains 12 functions that are briefly described below:

3.1. Form_Load( ) Start the detection of UFDs inserted or removed. Create the directory 'c:\USB_ports', if required. Ask to delete the directory: "c:\USB_ports" (if it exists) upon loading such that the directory is empty when used.

3.2. Form_Unload( ): Upon UFD removal, checks whether the directory 'C:\USB_ports' is empty. In this case, it means that the last UFD was removed, and then this function deletes the directory 'C:\USB_ports'.

3.3. boGen_Class_DeviceDetectNoDriveLetter( ) Activate the event 'DeviceDetectNoDriveLetter'. Checks whether a PSD (e.g., UFD) was either inserted or removed such that the UFD has no drive letter assigned to it. In case, the UFD was inserted, create directory that will be mounted for the inserted UFD. If the UFD is removed, then delete the directory of the removed UFD.

3.4. boGen_Class_DeviceDetectWithDriveLetter( ) Acts in a similar manner to 'boGen_Class_DeviceDetectNoDriveLetter( )', but since a drive letter is assigned to the UFD, this function also releases the drive letter that was created by the UFD's insertion.

3.5. Deltree( ) Delete a directory and all its subdirectories using API functions. This function is called by the above functions except 'boGen_Class_DeviceDetectWithDriveLetter( )', since in this case a drive letter is assigned and not a directory.

3.6. CreateDir( ): Creates a directory using API functions. This function is called with the required directory name from 'Form_Load( )' to create the directory 'C:\USB_ports', and from the functions 'boGen_Class_DeviceDetectNoDriveLetter( )' and 'boGen_Class_DeviceDetectWithDriveLetter( )' to create the directories for the corresponding UFD upon insertion.

3.7. GetVolumeFromDrive( ): Returns the volume name for drive letter. For example f:=>\\?\Volume {cc6f0f25-23ba-11db-8212-806d6172696f}\.

3.8. GetPathNamesFromVolumeName( ) Returns the directory that is mount pointed to the volume name. For example: '\\?\Volume{cc6f0f25-23ba-11db-8212-806d61726961f}\' returns 'c:\USB_ports\UFD1'.

3.9. FillVolumeNamesArray( ) Fills the 'msVolumeNameArr' array with the current volume's mount point. The 'msVolumeNameArr' array holds the current volume's mount point (e.g. when the function "mountvol" is run in command line.

3.10. GetFreeDirNum( ) Returns the current free number of directory that will be mounted for the last inserted UFD.

3.11. CompareVolumeArrays( ) Compares the new list of volumes mount pointed to the old list, and returns the volume name of the volumes added or removed.

Dismounting a volume in Windows XP as a drive, and instead allocating a directory for it:

1. Right Click on "My Computer" icon.
2. Click "Manage", a window appears with "Computer Management" in its banner area (top of the window).
3. Select "Disk Management" on the lower-left side of the window. Then, on the right side of the window, all volumes appear.
4. Select the volume that corresponds to the UPD already inserted.
5. Right-click the selected volume, and click "Change Drive Letter and Paths for . . .". The here stands for the name of the volume and drive letter already allocated. A window will appear with three buttons "Add . . ."; "Change . . ."; "Remove".
6. Click on the drive letter, and then click on "Remove". Then, confirm the operation in the message window opened. The window is closed, and the "Computer Management" window reappears.
7. Again, right-click on the desired volume in the right side of the "Computer Management", then click again "Change Drive Letter and Paths for . . .". Here, the '. . .' stands for the volume name only.
8. Click 'Add . . .'. A window opens. Click the radio button "Mount in the following empty NTFS folder". Insert the empty directory name directly, or browse for an empty directory in an existing NTFS drive. When browsing, one can also create a new directory for the designated volume.
9. Click "OK". Close the "Computer Management" window.

```
The device can now be approached as a directory in the selected NTFS drive.
ERSION 5.00
Begin VB.Form Fgen_Main
    Caption = "Form1" : ClientHeight = 3090 : ClientLeft = 60 : ClientTop = 450
    ClientWidth = 4680 : LinkTopic = "Form1" : ScaleHeight = 3090 : ScaleWidth = 4680
    StartUpPosition = 2 'CenterScreen : WindowState = 1 'Minimized
End
    Attribute VB_Name = "Fgen_Main" : Attribute VB_GlobalNameSpace = False
    Attribute VB_Creatable = False : Attribute VB_PredeclaredId = True
    Attribute VB_Exposed = False
    Option Explicit
    Dim WithEvents boGen_Class As Bgen_Class
' DeviceNotify.dll have a class module called: Bgen_Class (look at module "start")
    Attribute boGen_Class.VB_VarHelpID = -1
    Dim msVolumeNameArr(100, 2) As String
' This array holds the current volumes mount point
' as when the function "mountvol" is run in command line
    Dim msTmpVolumeName.Arr(100, 2) As String
    Dim liVolumeCount As Integer        ' The number of volumes mount pointed
    Dim liTmpVolumeCount As Integer
    Dim msDirNumArr( ) As Boolean
        'This array holds the directory's number like: UFD1,UFD2 ...
    Const HUB_DIR_ PATH As String ="c:\USB_ports"
        'The directory that holds all the subdirectories that will be created for the inserted UFDs
    Private Sub Form_Load( )
    Dim bDelTree As Boolean : Set boGen_Class = mbGen_Class : DoEvents
```

```
    boGen_Class.StratDetectMediaChange (Me.hWnd) ' Start the detection of UFDs inserted or
removed
    ReDim msDirNumArr(0) ' Array for the UFDs' directory numbers and their Status
    If Dir(HUB_DIR_PATH, vbDirectory) < > "" Then
        'Ask to delete the directory: "c:\USB_ports"
    If MsgBox("Delete the directory" & HUB_DIR_PATH & "?", vbYesNo) = vbYes Then
Deltree HUB_DIR_PATH
    End If
    CreateDir HUB_DIR_PATH ' Create the directory: "c:\USB_ports"
    liVolumeCount = 0 : liTmpVolumeCount = 0
    FillVolumeNamesArray msVolumeNameArr( ), liVolumeCount
End Sub
' The DeviceNotify.dll activates the event DeviceDetectNoDriveLetter
Private Sub boGen_Class_DeviceDetectNoDriveLetter( )
    Dim lsVolumeName As String : Dim lsDirName As String : Dim liDirNum As Integer
    Dim bFlag As Boolean
    FillVolumeNamesArray msTmpVolumeNameArr( ), liTmpVolumeCount
    If liTmpVolumeCount = liVolumeCount Then Exit Sub ' No UFD was inserted or removed
    lsVolumeName = CompareVolumeArrays( ) ' Returns the volume name of the volume added
or removed
    If liTmpVolumeCount >liVolumeCount Then ' UFD inserted
        liDirNum=GetFreeDirNum( )
        lsDirName=HUB_DIR_PATH & "\UFD"& liDirNum & "\"
        CreateDir lsDirName ' Create directory that will be mounted for the inserted UFD
        bFlag = SetVolumeMountPoint(lsDirName, lsVolumeName)
            ' Make the directory mount point to the volume name
        If bFlag = False, then MsgBox "Cannot Set Volume Mount Point for this Volume Name"
        msDirNumArr(liDirNum) = True
    Else ' UFD removed
        lsDirName = lsVolumeName
        lsDirName = Left(lsDirName, Len(lsDirName) -1)
        liDirNum = CInt(Mid(lsDirName, Len(HUB_DIR_PATH & "\UFD") +1))
        msDirNumArr(liDirNum) =False
    ' Deltree lsDirName
        RmDir lsDirName ' Delete the directory of the removed UFD
        End If
        FillVolumeNamesArray msVolumeNameArr( ), liVolumeCount
    End Sub
' The DeviceNotify.dll activates the event DeviceDetectWithDriveLetter
    Private Sub boGen_Class_DeviceDetectWithDriveLetter(isDriveLetter As String, bInserted
As Boolean, lsType As String)
        Dim bFlag As Boolean : Dim lsVolumeName As String : Dim lsDirName As String
        Dim liDirNum As Integer
        If bInserted = True And lsType = 2 Then ' lsType = 2 = DRIVE_REMOVABLE
            liDirNum = GetFreeDirNum( )
            lsDirName = HUB _ DIR_ PATH & "\UFD"& liDirNum & "\"
            CreateDir lsDirName ' Create directory that will be mounted for the inserted UFD
            lsVolumeName = GetVolumeFromDrive(lsDriveLetter)
            bFlag = SetVolumeMountPoint(lsDirName, lsVolumeName) ' Make the directory mount
point to the volume name
            If bFlag = False, Then MsgBox "Cannot Set Volume Mount Point for this Volume Name"
            msDirNumArr(liDirNum) = True
            bFlag =DeleteVolumeMountPoint(1sDriveLetter) ' Release the drive letter that was
created by the UFD's insertion
            If bFlag = False Then MsgBox "Cannot Delete Volume Mount Point for this Drive
Letter: "& lsDriveLetter
            FillVolumeNamesArray msVolumeNameArr( ), liVolumeCount
        ElseIf bInserted = False And 1sType = 2 Then ' Removable device was removed
            FillVolumeNamesArray msVolumeNameArr( ), liVolumeCount
        End If
End Sub
Private Sub Form_Unload(ByRef Cancel As Integer)
    If Dir(HUB_DIR_PATH, vbDirectory) < > "" Then
        If MsgBox("Delete the Directory "& HUB_DIR_PATH & "?", vbYesNo) = vbYes Then
Deltree HUB_DIR_PATH
    End If
    boGen_Class.StopSubClass : Set boGen_Class = Nothing : Set mbGen_Class = Nothing
End Sub
' Delete a directory and all its subdirectories using api function
    Private Sub Deltree(sDir As String)
        Dim SHFileOp As SHFILEOPSTRUCT : Dim lSuccess As Long
        With SHFileOp
            .wFunc = FO_DELETE : .pFrom = sDir : .fFlags = FOF_NOCONFIRMAT1ON
        End With
        On Error Resume Next
        lSuccess = SHFileOperation(SHFileOp)
        On Error GoTo 0
        If lSuccess < > 0 Then MsgBox "Problem with Deleting Directory:" & sDir End
        End If
```

```
End Sub
' Create a directory using api function
Private Sub CreateDir(sDir As String)
    Dim Security As SECURITY_ATTRIBUTES : Dim lSuccess As Long
    On Error Resume Next : lSuccess = CreateDirectory(sDir, Security)
    On Error GoTo 0
    If lSuccess = 0 Then MsgBox "Problem with Creating Directory:" & sDir End
    End If
End Sub
    ' Returns the volume name for drive letter {f: =>\\?\\Volume{cc6f0f25-23ba-11db-8212-
806d6172696f}\ )
Private Function GetVolumeFromDrive(sVolumeMountPoint As String) As String
    Dim buff As String : Dim cbbuff As Long : buff = Space$(1024) : cbbuff = Len(buff)
    If GetVolumeNameForVolumeMountPoint(sVolumeMountPoint, buff, cbbuff) <> 0 Then
        GetVolumeFromDrive = TrimNull(buff)
    End If
End Function
' Returns the directory that is mount pointed to the volume name (
\\? \Volume {cc6f0f25-23ba-11db-8212-806d6172696f}\=> c:\USB_ports\UFD1 )
Private Function GetPathNamesFromVolumeName(sVolumeName As String) As String
    Dim buff As Long : Dim BuffPathNames As String : Dim cbbuff As Long
    ' buff = Space$(1024) : BuffPathNames = Space$(1024) : cbbuff = Len(BuffPathNames)
    If GetVolumePathNamesForVolumeName(sVolumeName, BuffPathNames, buff, cbbuff) <
>
0 Then GetPathNamesFromVolumeName =TrimNull(BuffPathNames)
        End If
    End Function
Private Function TrimNull(startstr As String) As String
    TrimNull =Left$(startstr, lstrlen(StrPtr(startstr)))
End Function
' This sub fills the msVolumeNameArr array with the current volumes' mount points
Private Sub Fill VolumeNamesArray(ByRef lsVolumeName( ) As String, ByRef liCount As
Integer)
    Dim buff As String : Dim hVolume As Long : Dim cbbuff As Long
    Dim sVolumeMountPoint As String : Dim sTemp As String : Dim i As Integer
    i = 0 : buff= Space$(4096) : cbbuff = Len(buff) : hVolume = FindFirstVolume(buff, cbbuff)
    Do
        sVolumeMountPoint = TrimNull(buff) ' Debug.Print sVolumeMountPoint
        i = i + 1 : lsVolumeName(i, 1) = sVolumeMountPoint
        sTemp = GetPathNamesFromVolumeName(sVolumeMountPoint)
        lsVolumeName(i, 2) = sTemp : buff = Space$(4096) : cbbuff = Len(buff)
    Loop While FindNextVolume(hVolume, buff, cbbuff)
    FindVolumeClose hVolume : liCount = i
End Sub
' Returns the current free number of directory that will be mounted for the UFD
Private Function GetFreeDirNum( ) As Integer
    Dim liArrSize, i As Integer : liArrSize = UBound(msDirNumArr( ))
    For i= 1 To liArrSize
        If msDirNumArr(i) = False Then
            GetFreeDirNum = i : Exit Function
        End If
    Next
    liArrSize = liArrSize + 1 : ReDim Preserve msDirNumArr(liArrSize)
    GetFreeDirNum = liArrSize
End Function
' Compares the new list of volumes mount pointed to the old list
' and returns the volume name of the volume added or removed
Private Function CompareVolumeArrays( ) As String
    Dim i, j As Integer : Dim bFlag As Boolean
    If liTmpVolumeCount = liVolumeCount Then Exit Function
    If liTmpVolumeCount > liVolumeCount Then ' volume name added
        For i = 1 To liTmpVolumeCount
            bFlag = False
            For j = 1 To liVolumeCount
                If msTmpVolumeNameArr(i, 1) = msVolumeNameArr(j, 1) Then
                    bFlag = True
                    Exit For
                End If
            Next j
            If Not bFlag Then
                CompareVolumeArrays = msTmpVolumeNameArr(j, 1)
                Exit For
            End If
        Next i
    Else ' volume name removed
        For i = 1 To liVolumeCount
            bFlag = False
            For j = 1 To liTmpVolumeCount
                If msVolumeNameArr(i, 1) = msTmpVolumeNameArr(j, 1) Then
                    bFlag = True
```

```
            Exit For
        End If
    Next j
    If Not bFlag Then
        CompareVolumeArrays = msVolumeNameArr(i, 2)
        Exit For
    End If
  Next i
End If
If IsNull(CompareVolumeArrays) Then CompareVolumeArrays = ""
End Function
```

What is claimed is:

1. A hub to connect a plurality of storage devices to a host system, the hub comprising:
   a plurality of ports, each port of the plurality of ports associated with a particular physical location, wherein each of the plurality of ports is operative to electrically couple with a corresponding storage device;
   a plurality of switches;
   a plurality of electrical paths, each electrical path including a switch of the plurality of switches and operatively coupled to a corresponding port of the plurality of ports, the plurality of electrical paths coupling the plurality of ports to a common point that is operationally coupleable to the host system; and
   a controller operative to:
      responsive to the host system, control power connections to the plurality of ports, each power connection being controlled using a corresponding switch of the plurality of switches;
      for each particular port of the plurality of ports that is operatively coupled to a storage device, in response to the particular port being powered on:
         send mounting process information from the storage device to the host system; and
         after the storage device has been automatically mounted as a directory in a drive of the host system:
            retrieve an identity of a user from a file in the directory; and
            associate a corresponding physical location of the particular port with the identity of the user.

2. The hub of claim 1, further comprising a display device configured to display first data at a first display location, wherein the first data is stored in a first storage device, wherein the first display location corresponds to a first physical location, wherein the first physical location is associated with a first port of the plurality of ports, wherein the first port is coupled to the first storage device, and wherein the first port and the first storage device are located at physical locations that are distinct from the first physical location.

3. The hub of claim 1, wherein the ports are arranged in the hub in a port layout corresponding to physical locations of physical entities in a pre-defined space.

4. The hub of claim 3, wherein the physical entities in the pre-defined space include one of users in a room and seats in a room.

5. The hub of claim 3, wherein the port layout includes a grid.

6. The hub of claim 1, wherein one of the plurality of ports includes an operational connection point to another hub.

7. The hub of claim 1, wherein each port of the plurality of ports is adapted to engage with a port component selected from a universal serial bus (USB) device, a multi-media card, and a secured digital card.

8. The hub of claim 2, wherein the hub further comprises a port sensor configured to provide an indication of the electrical coupling of the first port and the first storage device by monitoring a current flow between the first port and the first storage device.

9. The hub of claim 1, wherein at least one of the plurality of storage devices includes a universal serial bus (USB) flash drive.

10. A method comprising:
    responsive to a host system, controlling power connections to a plurality of ports of a connectivity hub, each power connection being controlled using a corresponding switch of a plurality of switches of the connectivity hub;
    for each port of the plurality of ports that is operatively coupled to a storage device, in response to the port being powered on:
       sending mounting process information from the storage device to the host system; and
       after the storage device has been automatically mounted as a directory in a drive of the host system:
          retrieving an identity of a user from a file in the directory; and
          associating a corresponding physical location of the port with the identity of the user.

11. The method of claim 10, further comprising displaying first data at a first display location of a display device of the connectivity hub, wherein the first data is stored in a first storage device, wherein the first display location corresponds to a first physical location associated with a first port of the plurality of ports, wherein the first port is coupled to the first storage device, and wherein the first port and the first storage device are located at physical locations that are distinct from the first physical location.

12. The method of claim 11, further comprising displaying second data stored at a second display location of the display device, wherein the second data is stored in a second storage device, wherein the second display location corresponds to a second physical location associated with a second port of the plurality of ports, wherein the second port is coupled to the second storage device, and wherein the second port and the second storage device are located at particular physical locations that are distinct from the second physical location.

13. The hub of claim 1, wherein a time difference between a first time at which the host system connected power to a first port of the plurality of ports and a second time at which first mounting process information corresponding to the first port is sent to the host system is less than one second.

14. A method comprising:
    performing at a hub coupled to a computer system and having a plurality of ports, after a universal serial bus (USB) device is automatically mounted as a directory in a drive of the computer system upon the USB device being coupled to a port of the plurality of ports:

obtaining an identity of a user from a file retrieved from the directory; and associating a physical location with the identity of the user, wherein the port is associated with the physical location that is distinct from particular physical locations at which the port and the USB device are located.

15. The method of claim 14, wherein automatically mounting the USB device as the directory includes:

determining, upon the USB device being coupled to the port, whether the USB device is a portable storage device (PSD); and mounting the USB device as the directory upon determining that the USB device is the PSD.

16. The method of claim 15, wherein automatically mounting the USB device as the directory further includes:

upon determining that the USB device is the PSD, determining whether the drive includes a port directory;

mounting the USB device as a sub-directory of the port directory upon determining that a file system includes the port directory; and upon determining that the drive does not include the port directory, creating the port directory in the drive and mounting the USB device as the sub-directory of the created port directory.

17. The method of claim 16, wherein the sub-directory is deleted after the USB device is de-coupled from the port.

18. The method of claim 17, further comprising after deleting the sub-directory, deleting the port directory based on a determination that there are no remaining sub-directories under the port directory.

19. The method of claim 15, wherein the PSD is a USB flash drive.

20. The method of claim 15, wherein the PSD is a multi media card (MMC).

21. The method of claim 15, wherein the PSD is a secure digital (SD) card.

22. A hub comprising:

a plurality of ports; and a controller, the controller configured to:

after a universal serial bus (USB) device is automatically mounted as a sub-directory in a directory of a drive of a computer system to which the hub is attached when the USB device is coupled to a port of the plurality of ports, wherein the port is associated with a physical location that is distinct from particular physical locations at which the port and the USB device are located:

obtain an identity of a user from a file retrieved from the directory; and associate the physical location with the identity of the user.

23. The hub of claim 22, wherein before automatically mounting the USB device as the sub-directory, the controller is configured to:

determine, upon the USB device being coupled to the port, whether the USB device is a portable storage device (PSD); and mount the USB device as the sub-directory upon determining that the USB device is the PSD.

24. The hub of claim 23, wherein the controller is further configured to:

determine, upon determining that the USB device is the PSD, whether the drive includes a port directory;

mount the USB device as a sub-directory of the port directory upon determining that the drive includes the port directory;

upon determining that the drive does not include the port directory, create the port directory in the drive; and mount the USB device as the sub-directory of the created port directory.

25. The hub of claim 24, wherein the controller is further configured to delete the sub-directory after the USB device is de-coupled from the port.

26. The hub of claim 25, wherein after deleting the sub-directory, the controller is configured to delete the port directory based on a determination that there are no remaining sub-directories under the port directory.

27. The hub of claim 23, wherein the PSD is a USB flash drive.

28. The hub of claim 23, wherein the PSD is a multi media card (MMC).

29. The hub of claim 23, wherein the PSD is a secure digital (SD) card.

* * * * *